(12) United States Patent
Srikrishna et al.

(10) Patent No.: US 7,499,409 B2
(45) Date of Patent: Mar. 3, 2009

(54) WIRELESS MESH NETWORK VERIFICATION

(75) Inventors: Devabhaktuni Srikrishna, San Mateo, CA (US); Cyrus Behroozi, Menlo Park, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 690 days.

(21) Appl. No.: 11/118,501

(22) Filed: Apr. 29, 2005

(65) Prior Publication Data

US 2006/0245442 A1  Nov. 2, 2006

(51) Int. Cl.
*H04J 1/16* (2006.01)
*H04B 7/216* (2006.01)

(52) U.S. Cl. .................. 370/252; 370/230; 370/254

(58) Field of Classification Search ......... 370/278, 370/282, 328, 329, 400, 401, 331, 338, 252, 370/230–238, 254–258; 455/424, 452.2; 709/227, 219
See application file for complete search history.

(56) References Cited

U.S. PATENT DOCUMENTS

| | | | |
|---|---|---|---|
| 6,829,347 B1 | 12/2004 | Odiaka | |
| 6,885,660 B2 | 4/2005 | Inbar et al. | |
| 2002/0196752 A1* | 12/2002 | Attar et al. | 370/331 |
| 2004/0246935 A1 | 12/2004 | Joshi et al. | |
| 2004/0264372 A1 | 12/2004 | Huang | |
| 2005/0003826 A1 | 1/2005 | Khitrik et al. | |
| 2005/0093679 A1 | 5/2005 | Zia et al. | |
| 2005/0138178 A1 | 6/2005 | Astarabadi | |
| 2006/0056370 A1* | 3/2006 | Hancock et al. | 370/338 |
| 2006/0105764 A1 | 5/2006 | Krishnaswamy et al. | |
| 2008/0155064 A1* | 6/2008 | Kosuge et al. | 709/219 |
| 2008/0225730 A1* | 9/2008 | Srikrishna | 370/238 |

* cited by examiner

*Primary Examiner*—John Pezzlo
(74) *Attorney, Agent, or Firm*—Brian R. Short

(57) ABSTRACT

A method of verifying a mesh network is disclosed. The method includes identifying wireless links from a set of selected mesh network routing links, that have a link quality below a predetermined quality threshold, and providing a network manager with a link list that lists and prioritizes the identified wireless links according to a degree of impact each identified wireless link has on performance of the mesh network. Determining the degree of impact of each identified wireless link can include determining an amount the mesh network relies upon identified wireless link. Mesh network reliance can be dependent on how many routes through the mesh network include the identified wireless link. Determining the degree of impact of each identified wireless link can include determining a link quality of the identified wireless link.

23 Claims, 6 Drawing Sheets

IDENTIFYING WIRELESS LINKS FROM A SET OF SELECTED MESH NETWORK ROUTING LINKS, THAT HAVE A LINK QUALITY BELOW A PREDETERMINED QUALITY THRESHOLD

410

PROVIDING A NETWORK MANAGER WITH A LINK LIST THAT LISTS AND PRIORITIZES THE IDENTIFIED WIRELESS LINKS ACCORDING TO A DEGREE OF IMPACT EACH IDENTIFIED WIRELESS LINK HAS ON PERFORMANCE OF THE MESH NETWORK

WIRELESS MESH NETWORK VERIFICATION

FIELD OF THE INVENTION

The invention relates generally to networking. More particularly, the invention relates to an apparatus and method for verifying operation of wireless mesh networks.

BACKGROUND OF THE INVENTION

Wireless networks include wireless links that are typically subject to environmental conditions that influence performance of the wireless links. The environmental conditions include signal interference, transmission signal attenuation and transmission signal multi-path. Typically, the environmental conditions vary over time.

One type of wireless network is a wireless mesh network. Wireless mesh networks can be particularly susceptible to environment conditions because wireless mesh networks typically include more wireless links than other types of networks, and therefore, are more likely to include poor quality links.

One type of wireless mesh network includes packet networking. Packet networking is a form of data communication in which data packets are routed from a source device to a destination device. Packets can be networked directly between a source node and a destination node, or the packets can be relayed through intermediate nodes.

Communication through wireless mesh networks requires determination of routing paths through the wireless mesh network. Ideally, the determined routing paths are the optimal routing paths that include a minimal number of poor quality links. However, physical placement of access nodes may not allow for routing selections that do not include any poor quality links. The number of poor quality links can be mitigated by either adding access nodes, or moving existing access nodes.

It is desirable to have a method and system for verifying the reliability of a mesh network. It is further desirable that the method and system provide information allowing a system operator to modify the mesh network to improve the reliability and performance of the mesh network. The information provided to the system operator should be simple enough that the system operator can easily understand where problem links within the mesh network are located.

SUMMARY OF THE INVENTION

An embodiment of the invention includes a method of verifying a mesh network. The method includes selecting mesh network routing links, and identifying wireless links from a set of selected mesh network routing links, that have a link quality below a predetermined quality threshold.

Another embodiment of the invention includes a method of verifying a mesh network. The method includes identifying wireless links from a set of selected mesh network routing links, that have a link quality below a predetermined quality threshold, and providing a network manager with a link list that lists and prioritizes the identified wireless links according to a degree of impact each identified wireless link has on performance of the mesh network. Determining the degree of impact of each identified wireless link can include determining an amount the mesh network relies upon identified wireless link. Mesh network reliance can be dependent on how many routes through the mesh network include the identified wireless link. Determining the degree of impact of each identified wireless link can additionally, or alternatively, include determining a link quality of the identified wireless link.

Another embodiment also includes a method of verifying a mesh network. This embodiment includes designating endpoints within the mesh network, and choosing a section of the mesh network for verification, as defined by the designated endpoints. Within the chosen section of the mesh network, wireless links are identified from a set of selected mesh network routing links that have a link quality below a predetermined quality threshold. A network manager is provided with a link list that lists and prioritizes the identified wireless links according to a degree of impact each identified wireless link has on performance of the mesh network.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 is a flow chart showing steps included within a method of wireless mesh network verification.

DETAILED DESCRIPTION

The invention includes an apparatus and method of verifying performance of mesh networks. The verification can be on wireless links, and associated wired links. The verification is scalable and provides an automated means for diagnosing faults. The verification can provide a network manager with information that allows the network manager to proactively improve the performance of the mesh network.

Figure 1:
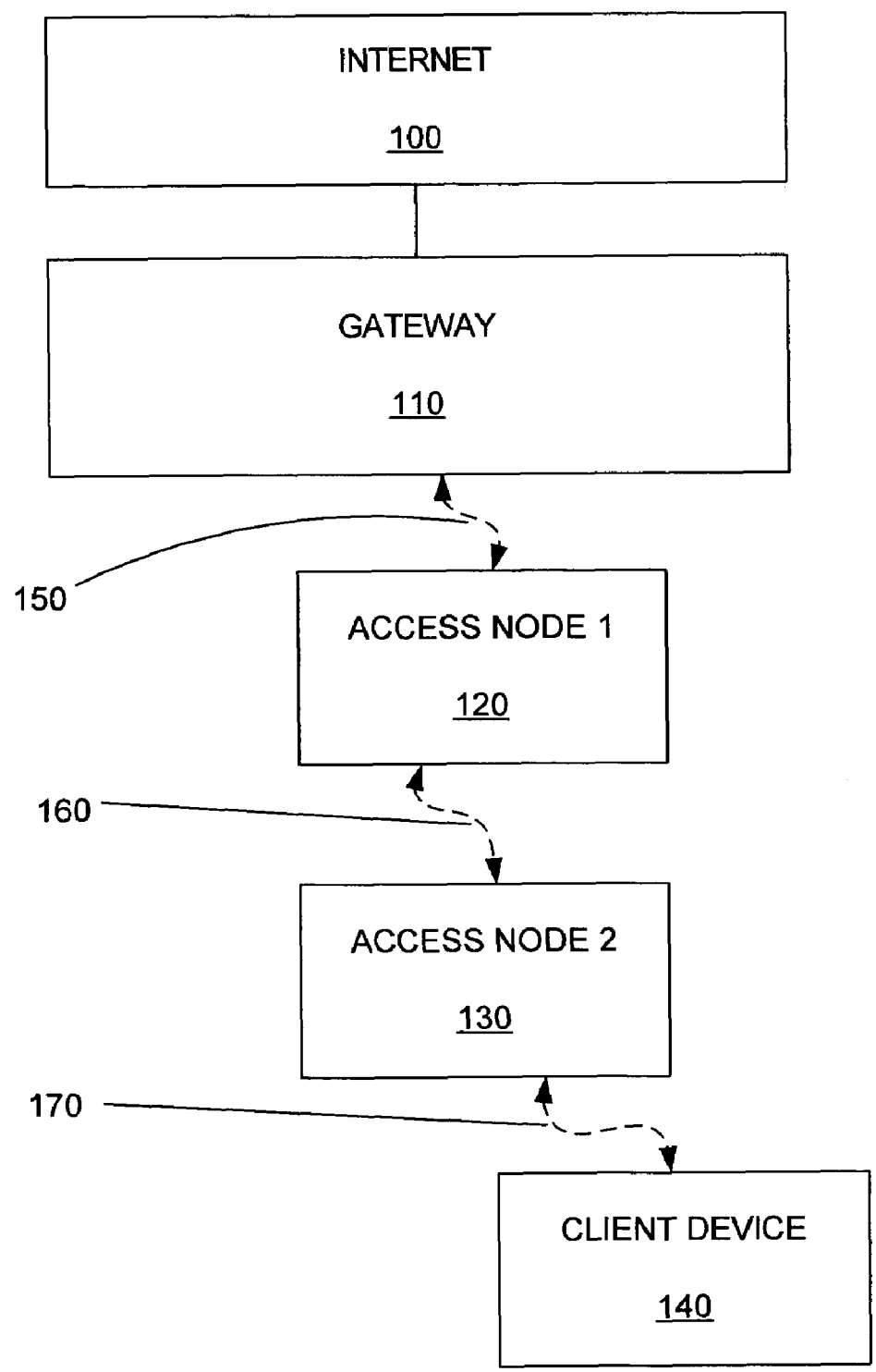
FIG. 1 shows a wireless mesh network.

FIG. 1 shows a wireless mesh network that includes a client device 140. The client device 140 is wirelessly connected to an access node 130. The wireless access node 130 is wirelessly connected to a wired gateway 110 through another wireless access node 120. The wired gateway 110 can provide access to the internet 100.

The transfer of information from the client 140 to the gateway 110 is generally two-way. That is, generally information flows from the client device 140 to the gateway 110 (generally referred to as upstream traffic) and information flows from the gateway 110 to the client device 140 (generally referred to as downstream traffic). Devices (access node or gateways) that receive upstream traffic from a particular device can be referred to as upstream devices, and devices (access nodes or clients) that receive downstream traffic from a particular device can be referred to as downstream devices. The rate of data that can flow between the gateway 110 and the client device 140 is called throughput. It is desirable to maximize the throughput of wireless mesh networks.

The communication between the gateway 110, the access nodes 120, 130 and the clients 140 is typically through predefined transmission channels, that can be designated as links 150, 160, 170. Specific ranges of the frequency spectrum are typically allocated for the transmission between the devices.

Typically, particular frequencies of transmission operated better in particular environments. For example, certain ranges of transmission frequencies suffer from more multi-path and fading than other ranges of frequency transmission in a particular setting.

As will be described, an embodiment of the gateway 110 transmits routing beacons that are received by downstream devices (access nodes 120, 130). The access nodes 120, 130 make routing selections based on received routing beacons. Each access node 120, 130 can receive routing beacons from multiple upstream devices (gateways or other access nodes).

Figure 2:
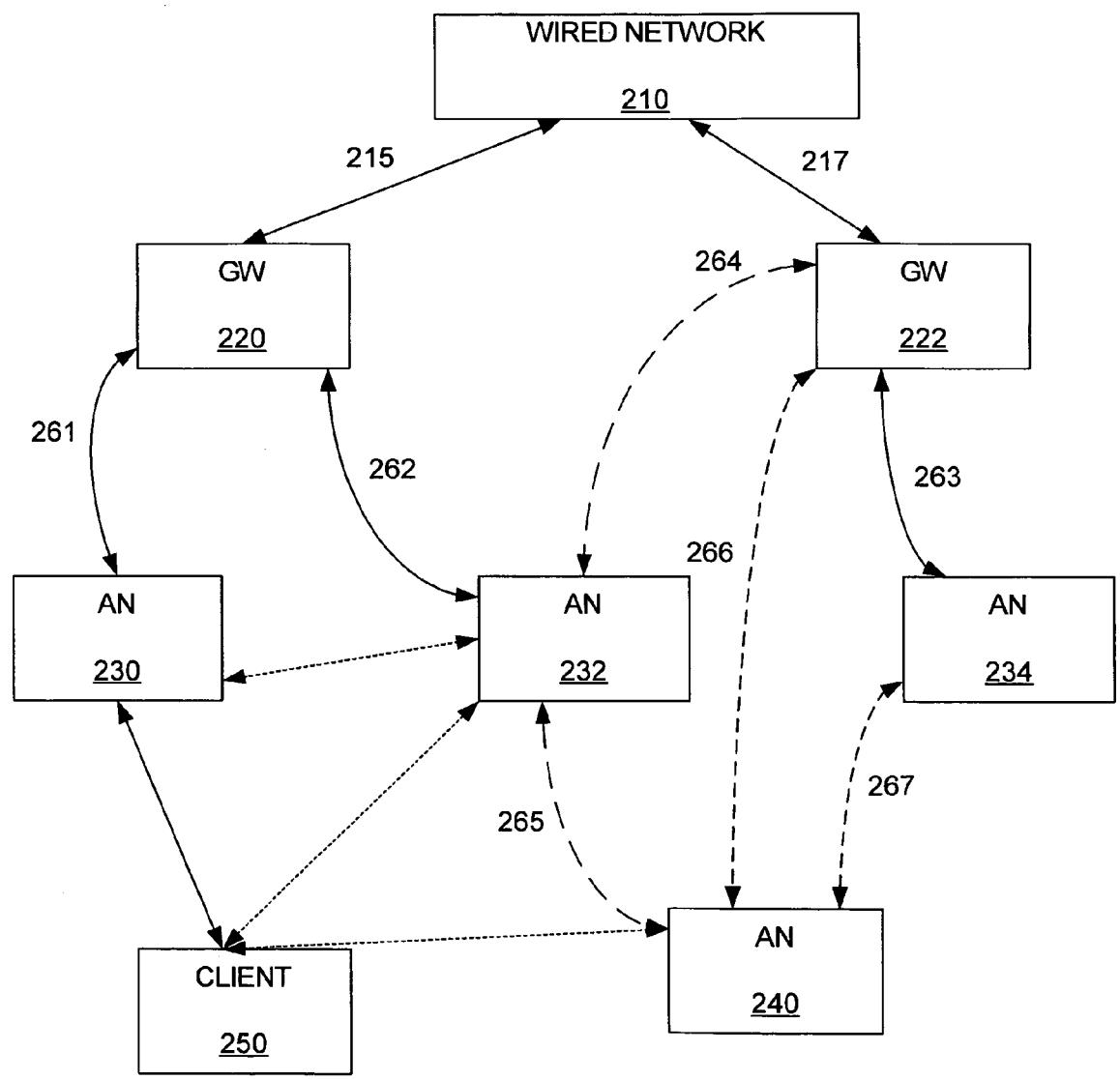
FIG. 2 shows routing selections of the wireless mesh network.

FIG. 2 shows routing selections of a wireless mesh network. FIG. 2 includes a client device 250 in communication with one of access nodes 230, 232, 240. Any number of routing paths through the mesh network can be selected for providing the communication between the client device 250 and the available gateways 220, 222. The client device 250 can communicate directly with the gateways 220, 222, or the communication can be routed through any number of the intermediate access nodes 230, 232, 234, 240. For example, the client may communicate with access node 230, which can communicate directly with gateway 220 through the link 261. Alternatively, the access node 230 can communicate with the gateway 220 through access node 232 and link 262. Selection of the routing path between the access nodes and the gateways is substantially dependent upon the quality of the links between the access nodes and between the access nodes and the gateways.

Access node 232 can communicate with gateway 220 through link 262, or if link 264 to gateway 222 is or becomes better than the link 262, then the access node 232 can switch over to communicating with the gateway 222. Similarly, access node 240 can use either of links 265, 266 or 267 depending upon which of the links provides a better transmission path to one of the gateways 220, 222. Link 263 can provide access node 234 with a communication path to gateway 222.

The links 215, 217 between the gateways 220, 222 and the wired network can be wired or wireless links. Although only a limited number of gateways 220, 222 and access nodes 230, 232, 234, 240 are shown in FIG. 2, it should be understood by one skilled in the art that an almost unlimited numbers of access nodes, at almost unlimited number of hops from the gateways 220, 222 may be implemented.

Routing Selections of Mesh Networks

For an exemplary method of routing, the gateways 220, 222 play a central role in the discovery of routes by the access nodes. At periodic intervals, each gateway originates a "beacon" which is broadcast to all access nodes within receiving range of the gateway. The time interval between successive broadcasts of the beacons defines a routing cycle. The beacon is a routing packet—a short data packet that contains the address of the gateway. The beacon can include the following information: (1) a sequence number which identifies which routing cycle it initiates, 2) the address (MAC or IP) of the gateway. The address of the gateway may be included in the Ethernet header or IP header of the beacon message.

Each access node that receives a gateway broadcasts beacon, rebroadcast a beacon as well. The access nodes rebroadcast at a rate that is the same as the broadcast rate of the gateways. The rebroadcast beacons can include additional information that is added by the re-broadcasting access node.

For one embodiment, the gateway may add a hop-count counter set to 0. This hop point counter can be incremented by each access node that rebroadcasts the beacon. This permits the receiving access node to determine how many hops the gateway is away from the access node.

On receipt of the beacon, each level one access node has a path to connect to the gateway. For one embodiment, each of the level one access nodes has the following data: (1) its connectivity to the gateway, (2) a means to gain access to the gateway (since it now knows the address of the gateway and can direct transmissions to it). After a small delay, each level one access node (such as access nodes 230, 232, 234) rebroadcasts the beacon, after appending to the beacon its own address. For one embodiment, the delay is a random delay, such that not all level one access nodes broadcast at the same time. The access node may only increment a hop-count counter of the received beacon before re-broadcasting it. For another embodiment, the access node may rebroadcast the beacon unaltered.

For one embodiment, the rebroadcast beacon now contains (1) the sequence number, (2) the address of the gateway, (3) the address of the level one access node. Alternatively, the beacon may only include a hop-count, and/or a sequence number.

This beacon is now received by all access nodes that are two hops from the gateway (level two access nodes, for example, access node 240). On receipt of the beacon, each level two access node now knows, for one embodiment, (1) that it has connectivity to the gateway, (2) an explicit route to the next upstream access node (the level one access node whose broadcast it received), 3) the full path to the gateway through the upstream level one access node. For one embodiment, each level two access node now knows (1) that it has connectivity to the gateway and (2) an explicit route to the next upstream access node. For one embodiment, each level two access node knows the number of hops to the gateway through the next upstream access node.

It may happen that a level two access node 240 receives a beacon rebroadcast from two or more level one access nodes. In this case, the second level access node selects one of the proffered routes, and reject the other(s). For one embodiment, the route that has the best link quality is selected. As described above, the link quality, for one embodiment, includes the fraction of successfully received beacons. For one embodiment, it may further include other link quality factors.

Each access node at level two now rebroadcasts the beacon. For one embodiment, it rebroadcasts the beacon after having appended its address to the beacon. For one embodiment, it rebroadcasts the beacon after having incremented the hop-count of the path back to the gateway. For another embodiment, it rebroadcasts the beacon unaltered. As discussed above, this optimal path or optimal beacon may be selected based on link quality, priority in receiving the beacon, or based on another evaluation. By iteration of this process at each level, each access node that has connectivity to the gateway (i.e., that can link to the gateway through functional links potentially mediated by other access nodes) becomes aware of its own connectivity to the gateway. For one embodiment, each access node knows a complete path to the gateway. For another embodiment, each access node knows only the next upstream access node on way to the gateway.

The beacons can be lost at any point in a wireless network due to link failures or fading. As the beacons travel through the network by way of rebroadcasts at access nodes, the packet losses (of the beacons) are cumulative. As a result, the number of beacons received at an access node advertising a particular path is generally less than the ideal (loss-less) number of beacons that could possibly be received.

The access nodes can include logic for analyzing the number of beacons received that advertise each of the possible routing paths. This analysis, which generally takes into account the fraction of beacons successfully received for each possible path, on a multiplicity of time scales, determines which of the available paths is the "best" or "optimal" path. A routing decision can be made based upon the determination of which is the best path. The routing decision of an access node, selects the default gateway of the access node to be the next hop along the selected path. The result is that routes set up through the wireless network correspond to the set of selected optimal paths. Generally, the routing includes methods for allowing access nodes to analyze all advertised routing paths and selecting an optimal path.

The routing can include path evaluation that tracks the set of possible paths, maintains history which can be used to evaluate paths based on criteria related to path availability and throughput. The routing further includes selecting an optimal path.

The path logic uses reception versus loss of path identifying beacons to characterize the end-to-end path from a wired gateway to each access node. The path selection of each of the access nodes consists of one or more screening processes in which the paths with the best availability, consistency and/or throughput are selected. After the screening processes, an optimal path can be selected.

The above-described methods of routing are exemplary. The verification methods and systems described can be applied to mesh networks that include other methods of routing.

"Problem" Links within the Mesh Network

Figure 3:
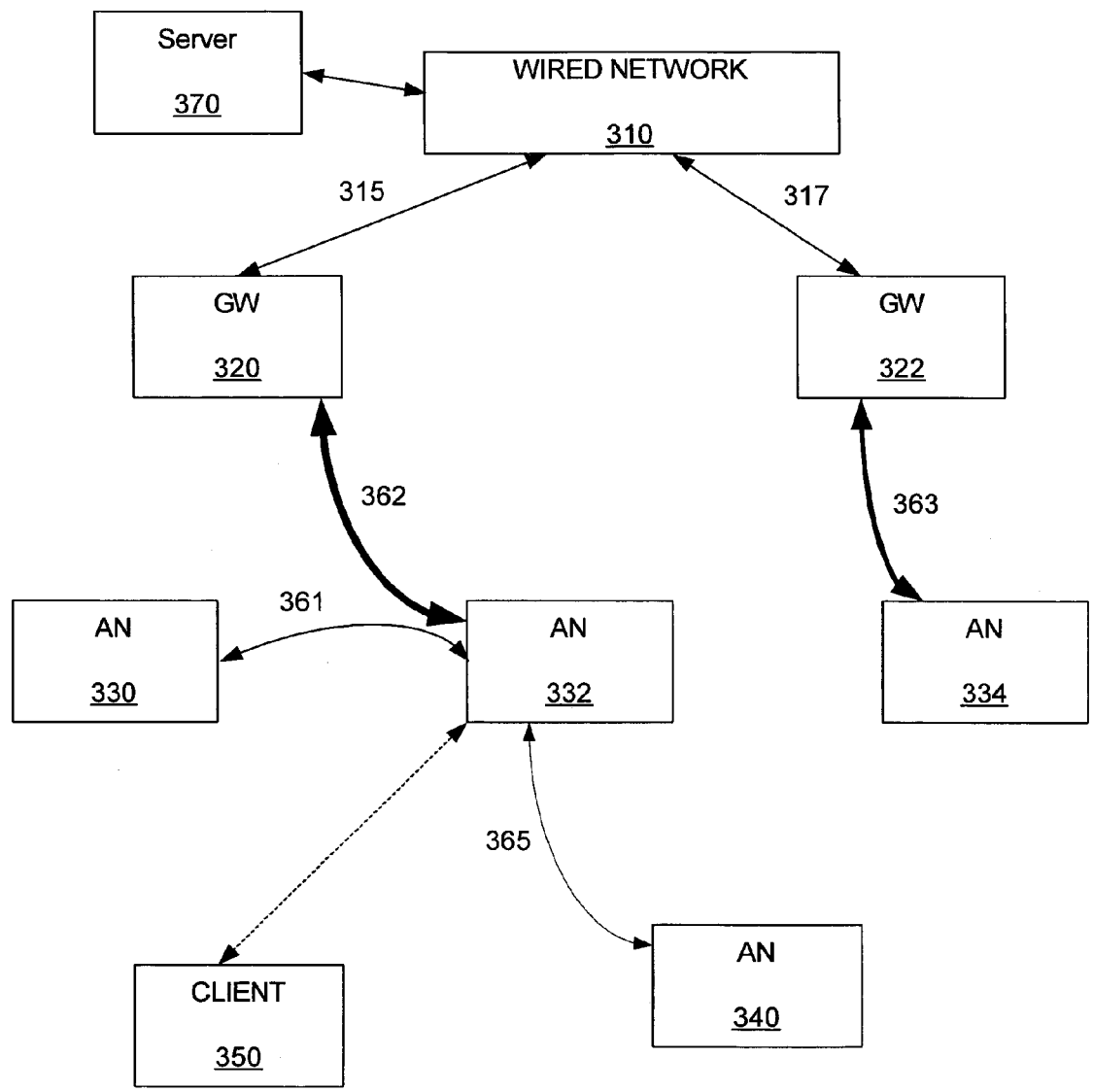
FIG. 3 shows problem links within a wireless mesh network that may require re-routing of paths through the wireless mesh network.

FIG. 3 shows problem links within a wireless mesh network that may require re-routing of paths through the wireless mesh network. Generally, problem links can be defined as links that reduce the throughput and increase the packet loss of the mesh network greater than an acceptable (predetermined) amount. Many different parameters can be used to determine what constitutes a problem links.

FIG. 3 shows a mesh network that includes gateways 320, 322 connected through links 315, 317 to a wired network. The links 315, 317 can be wired or wireless. Routing selection of the mesh network can cause access nodes 330, 332, 334, 340 to select links 362, 363, 361, 363, 365 to provide access to the gateways 320, 322.

During operation, links 362, 363 may be problem links that suffer from high packet error rates, low throughput or excessive latency. It is possible that these links were problem links when selected, but were the best available links. Alternatively, these links may become poor (problem links) over time. Link 362 may be particularly problematic because several downstream access nodes 330, 332, 340 use the link 362 to access the gateway 320. That is, the mesh network places a higher reliance upon the link 362 than other depicted links 361, 363, 365 of the mesh network. Therefore, if this link is a problem link, it can have a greater impact on the performance of the mesh network than the other links. Problem links can exist between gateways, between gateways and access nodes, between access nodes, and/or between clients and access nodes or gateways.

Verification of the mesh network can include verifying the link quality of each of the individual links. Alternatively, verification can include end point to end point testing of paths through the mesh network. For example, an end point to end point test can include testing a path between a server 370 and a client 350. The packet error rate, throughput and/or latency can be tested between the server 370 and the client 350. The path between the server 370 and the client includes several links, in which any one of the links may be determined to be a problem link. End points can be defined as any server, gateway, access node or client connected to the mesh network. The links can be wired or wireless, and can exist between any device (server, gateway, access node or client) within the mesh network.

Large mesh networks with many access nodes, and therefore, many possible routing paths, can include a large number of links. One can appreciate that the number of possible routes and the number of possible problem links can be extremely large. One challenge faced by a network operator is verifying operation of the large number of links. The verification should provide the network operator with results that are not so voluminous, and onerous that the results are not useful. The results of the verification are ideally simple enough that the network operator can understand where problem links and problem routing paths exit, so that the network operator can make proper adjustments or modifications to the network.

FIG. 4 is a flow chart showing steps included within a method of wireless mesh network verification. The a first step 410 includes identifying wireless links from a set of selected mesh network routing links, that have a link quality below a predetermined quality threshold. This step is generally performed after selecting mesh network routing links. Selecting mesh network routing links can be performed with routing beacons as previously described. A second step 420 can include providing a network manager with a link list that lists and prioritizes the identified wireless links according to a degree of impact each identified wireless link has on performance of the mesh network.

Degree of Impact of a Link

The degree of impact that a particular link has on the performance of a mesh network is generally largely dependent upon how much the mesh network relies upon the link. Mesh networks (like those shown in FIGS. 2 and 3) typically include links that operate as an uplink to more access nodes and clients than other links. Therefore, more access nodes and clients depend on these links, and poor link quality as determined by the packet error rate (PER) and throughput of the link can greatly influence the performance of the mesh network.

The number of access nodes and clients that depend on a link is dependent upon the routing selections of the mesh network. If the routing selects a poor quality link as an uplink for a large number of access nodes and clients, verification can identify the link, thereby allowing a network manager to mitigate the effects on the mesh network. The link 362 of FIG. 3 is an example of a link that the mesh network relies upon more than other links. Determining degree of impact of each identified wireless link includes determining an amount the mesh network relies upon identified wireless link. The amount the mesh network relies upon the identified wireless link is dependent on how many routes through the mesh network include the identified wireless link.

Selected Set of Links

A selected set of mesh network routing links includes links that have been identified as having a link quality below a predetermined quality threshold. The determination of what constitutes a set can be defined in several different ways. For example, the set can include links within the mesh network that do not meet a predetermined level of quality (quality as determined by PER, throughput or latency of the link). Other examples of links that can be included with a set are links that do not meet a predetermined quality threshold greater than a predetermined percentage of monitored times. That is, for example, monitoring of the link quality over time can reveal an approximate percentage of time the links fall below a predetermined quality threshold. Both the link quality and the percentage of time the link falls below a threshold can be used to determine whether a link is included within the set of selected links. Another example of links that can be included with the set are links that do not meet a predetermined quality threshold during pre-selected monitored times. For example, the quality of some links may suffer during specific periods of time (for example, specific periods of time during the day). If the periods of poor link quality occur in the middle of the night, for example, this may not be a problem. However, if the periods of poor link quality occur during peak mesh access periods, this poor link quality could be a problem, and warrants including the link in the set. The pre-selected monitored times should be times of high mesh network usage. An embodiment includes the set of selected mesh network routing links being routing links that are do not meet the predetermined quality threshold greater than a predetermined percentage of time during designated high use times of the mesh network.

Link List

The link list lists and prioritizes identified wireless links according to a degree of impact each identified wireless link has on performance of the mesh network. As previously described, the degree of impact is dependent upon the reliance of the mesh network on the link and/or the link quality of the link.

The link list can also provide the network manager with information about each identified wireless link that allows the network manager to determine whether to add an additional access node, move an existing access node, or select a new transmission channel for the identified wireless link. That is, the link list can include information about the links on the link list that allows the network manager to take corrective actions to mitigate the effects of the listed links. The corrective action is not limited to those listed here. Other embodiments can include the network adaptively mitigating the effects of a poor link. For example, the network could try alternate transmission channels to improve link quality. The network could also tune or adjust smart antennas of devices of the mesh network.

The link list provides information to the network operator that is easy for the network operator to read and understand where problem links are located. Additionally, the information is presented so that the network operator can easily understand how to take corrective action to improve problem links within the mesh network. The information provided to the network manager can include information of noise levels, signal levels or information regarding hidden neighboring devices, associated with signals and devices of the mesh network. A hidden neighbor device can be defined as a device (access node, gateway or client) that a particular other device cannot communicate with, but shares a common upstream device (such as a third access node, or a gateway).

Packet Loss

Determination of packet loss requires determining the number of packets that are lost during transmission through a link. The previously described beacons can be used for estimating the packet loss. As described, the beacons can be transmitted at a particular rate (for example, 4 per second). Knowing the transmission rate, the packet loss can be determined by comparing the transmission rate with the rate in which beacons are received. Beacons can be repopulated by intermediate nodes to maintain the transmission rate throughout the mesh network. That is, intermediate access nodes can introduce (repopulate) lost beacons so that the original transmission rate is maintained throughout the mesh network.

Throughput

Link throughput can be determined by directly measuring the throughput traffic through the link.

Latency

Link latency can be measured by timing a round trip path of transmission between access nodes of a link. That is, each link includes two access nodes, one at each end of the link. Timing of transmission through the link from one end of the link, to the other end of the link, and back the transmitting end of the link provides a measure of the latency through the link. The link latency is typically dependent upon the packet loss through the link, and/or contention between access nodes for the link.

Initiation of Verification

Initiation of the network verification can be implemented in one of several different ways. Exemplary methods of initiating the verification include network manager initiated verification, periodically initiated verification and distributed initiated verification. It is to be understood that any combination of these verification methods can be used.

Network manager initiated verification includes a network manager initiating verification. That is, mesh network verification is initiated when the network manager desires verification of the network.

Periodic initiated verification includes the verification being initiated at a regular frequency, for example, a day, a week or a month. If the mesh network is in a stable environment in which the qualities of the links are stable, then the verification period can be large. If the mesh network is in a dynamic environment and the qualities of the links are unstable, then the verification period could be selected to be small.

An issue with verification is that the verification requires network resources to operate. This use of network resources reduces the capacity of the network dedicated to perform normal trafficking of information through the mesh network. Clearly, it is desirable to minimize the effects the mesh network verification has on the operation of the mesh network. Background verification can be used to continually verify the performance of the mesh network while minimizing the effects of the verification on the performance of the mesh network.

Background mesh network initiated verification includes verifying small subsets of the mesh network at any given time. For example, the verification can be performed as a link by link process. By performing the verification on only a small subset of the network, the impact of the verification on the performance of the mesh network can be minimized. The verification process can include performing link by link verification over time until the entire mesh network has been verified. Once the mesh network has been verified, the process can start over again. The background verification process can be continual, or initiated at periodic intervals.

End Point to End Point Verification

Another desirable method of verifying operation of a mesh network includes verifying particular segments of the mesh network. For example, it can be desirable to verify operation of the mesh network between specified end points of the mesh network. End points can include clients, access nodes, gateways or servers connected to the mesh network.

The mesh network can be additionally segmented by limiting the verification of the mesh network to specific routing paths between the specified end points. That is, the number of routes between specific end points can be very large. Many of the routing paths may be so unlikely that verification of them is not useful, and verification of them is a waste of networking resources.

Figure 5:
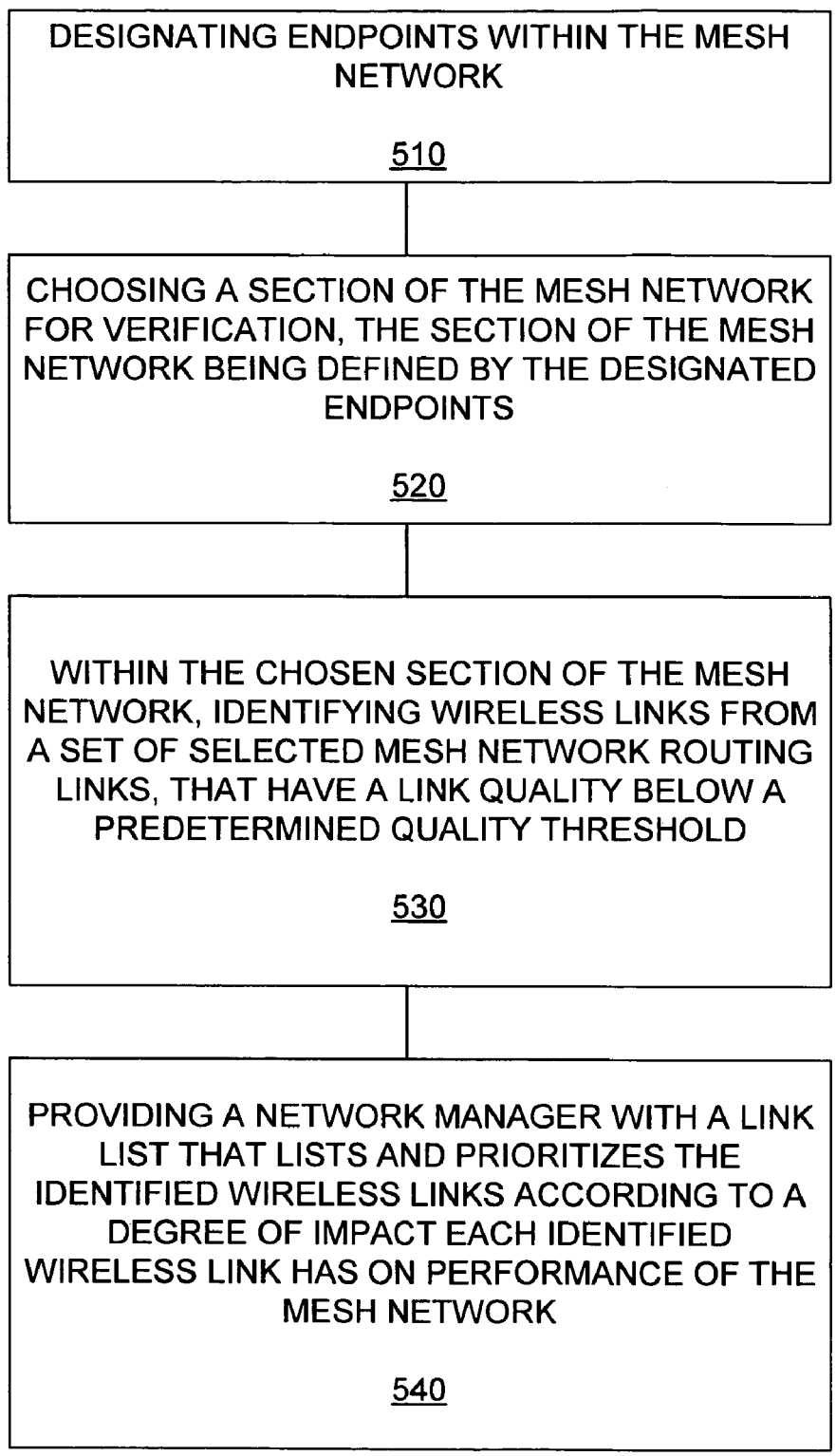
FIG. 5 is a flow chart showing steps included within another method of wireless mesh network verification.

FIG. 5 is a flow chart showing steps included within a method of wireless mesh network end point to end point verification. A first step 510 of the method includes designating endpoints within the mesh network. A second step 520 includes choosing a section of the mesh network for verification, the section of the mesh network being defined by the designated endpoints. A third step 530 includes within the chosen section of the mesh network, identifying wireless links from a set of selected mesh network routing links, that have a link quality below a predetermined quality threshold. A fourth step 540 includes providing a network manager with a link list that lists and prioritizes the identified wireless links according to a degree of impact each identified wireless link has on performance of the mesh network.

Mesh Links

Mesh links can be defined as links between access nodes, or between gateways and access nodes of the mesh network.

Client Links

Client links can be defined as links between client devices and access nodes, or between client devices and gateways. Typically, 802.11 clients do not have much capability for testing links.

Gateway Links

Gateway links can be defined as links between gateways. These links can include both wired and wireless links. Typically gateways are separated by multiple layers of wireless backhaul, copper, or fiber links. Each gateway can include a list of other (peer) gateways in which link tests can be run. The listings can separate gateways depending upon whether the gateways are on the same or different subnets.

Figure 6:
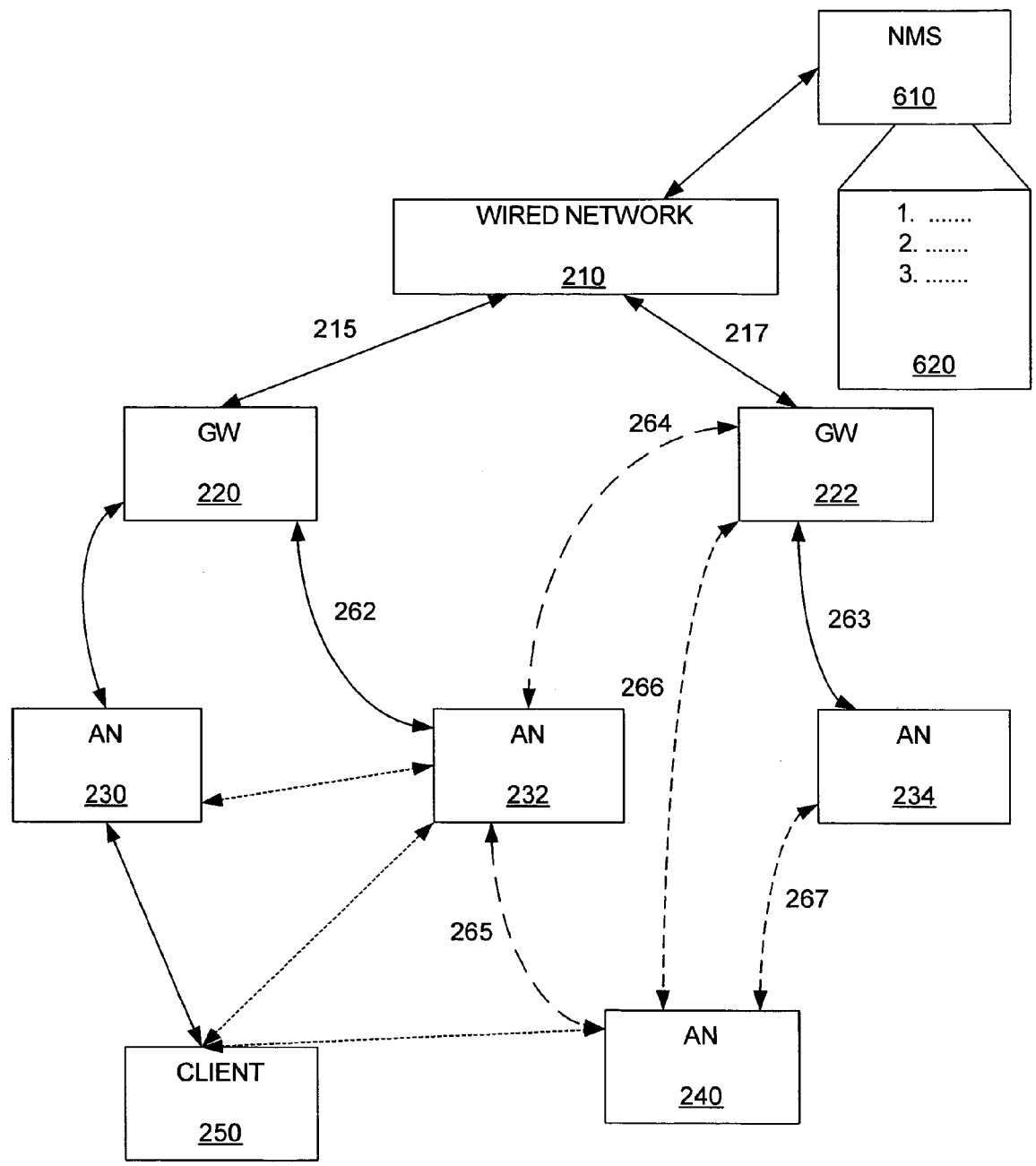
FIG. 6 shows a network manager system connected to a mesh network which can provide a link list to a network operator.

FIG. 6 shows a network manager system (NMS) 610 connected to a mesh network which can provide a link list 620 to a network operator. The NMS as shown is connected to the wired network 210. The NMS 610 can be connected to the mesh network at other points of the network. The network verification provides the network operator with information (referred to here as a link list) that allows the network operator to make an intelligent decision about how to improve performance of the mesh network when the mesh network includes problem links. The form of the information provided is not as important as the information itself. The information need only to convey to the network operator how to take corrective action, or action to improve network performance. As previously stated, the verification can be over whole network, or over designated portions.

Although specific embodiments of the invention have been described and illustrated, the invention is not to be limited to the specific forms or arrangements of parts so described and illustrated. The invention is limited only by the appended claims.

What is claimed:

1. A method of verifying a mesh network comprising:
    selecting mesh network routing links; and
    identifying wireless links from a set of selected mesh network routing links, that have a link quality below a predetermined quality threshold;
    providing a network manager with a link list that lists and prioritizes the identified wireless links according to a degree of impact each identified wireless link has on performance of the mesh network.

2. The method of claim 1, wherein determining the degree of impact of each identified wireless link comprises determining an amount the mesh network relies upon the identified wireless link.

3. The method of claim 2, wherein the amount the mesh network relies upon the identified wireless link is dependent on how many routes through the mesh network include the identified wireless link.

4. The method of claim 1, wherein determining the degree of impact of each identified wireless link comprises determining a degree of link quality of the identified wireless link.

5. A method of verifying a mesh network comprising:
    selecting mesh network routing links; and
    identifying wireless links from a set of selected mesh network routing links, that have a link quality below a predetermined quality threshold;
    wherein the set of selected mesh network routing links are routing links that have a link quality below a predetermined quality threshold greater than a predetermined percentage of monitored times.

6. A method of verifying a mesh network comprising:
    selecting mesh network routing links; and
    identifying wireless links from a set of selected mesh network routing links, that have a link quality below a predetermined quality threshold;
    wherein the set of selected mesh network routing links are routing links that have a link quality below a predetermined quality threshold greater than a predetermined percentage of time during designated high use times of the mesh network.

7. The method of claim 1, wherein the link list provides the network manager with information about each identified wireless link that allows the network manager to determine whether to at least one of add an additional access node, move an existing access node, or select a new transmission channel for the identified wireless link.

8. The method of claim 7, wherein the information provided to the network manager includes at least one of noise levels, signal levels or information regarding hidden neighboring access nodes.

9. The method of claim 1, wherein the predetermined quality threshold is a level of packet loss of packets transmitted through the wireless links.

10. The method of claim 9, wherein the packet loss is determined by monitoring loss of routing beacons being transmitted through the mesh network.

11. The method of claim 10, wherein the routing beacons are initially transmitted by at least one gateway at a predetermined rate, and lost routing beacons are repopulated by access nodes within the mesh network to maintain the predetermined rate of routing beacon transmission through the mesh network.

12. The method of claim 10, wherein the routing beacons are transmitted according to an 802.11 protocol.

13. The method of claim 1, wherein the predetermined quality threshold is a level of latency through the wireless links.

14. The method of claim 13, wherein determining a latency through each wireless link includes timing round trip packet transmission between access nodes associated with the each wireless link.

15. A method of verifying a mesh network comprising:
    selecting mesh network routing links; and
    identifying wireless links from a set of selected mesh network routing links, that have a link quality below a predetermined quality threshold;

wherein mesh network verification is background performed, distributing loading of the mesh network to minimize effects of the verification on performance of the mesh network.

16. The method of claim 1, wherein the wireless links include wireless links between access nodes.

17. The method of claim 16, wherein packet error tests are performed by routing routines and reported for links used by greater than a predetermined number of mesh network routes.

18. The method of claim 1, wherein the wireless links include wireless links between access node and clients.

19. The method of claim 1, wherein the wireless links include links between gateways.

20. The method of claim 19, further comprising:
   identifying wireless links and wired links from gateway to gateway links, that do not meet a predetermined quality threshold.

21. A method of verifying a mesh network comprising:
   designating endpoints within the mesh network;
   choosing a section of the mesh network for verification, the section of the mesh network being defined by the designated endpoints;
   within the chosen section of the mesh network, identifying wireless links from a set of selected mesh network routing links, that have a link quality below a predetermined quality threshold;
   providing a network manager with a link list that lists and prioritizes the identified wireless links according to a degree of impact each identified wireless link has on performance of the mesh network.

22. The method of claim 21, wherein choosing the section of the mesh network for verification further includes the section of mesh network being defined by specific routing paths between the designated endpoints.

23. A mesh network verification system, comprising:
   means for identifying wireless links from a set of selected mesh network routing links, that have a link quality below a predetermined quality threshold;
   means for providing a network manager with a link list that lists and prioritizes the identified wireless links according to a degree of impact each identified wireless link has on performance of the mesh network.

* * * * *